United States Patent [19]

Via et al.

[11] 3,864,394

[45] Feb. 4, 1975

[54] PROCESS FOR PREPARING PHENYLPHOSPHONOUS DICHLORIDE

[75] Inventors: Francis A. Via, Yorktown, N.Y.; Eugene H. Uhing, Ridgewood, N.J.; Arthur D. F. Toy, Stamford, Conn.

[73] Assignee: Stauffer Chemical Company, Westport, Conn.

[22] Filed: Nov. 19, 1973

[21] Appl. No.: 417,172

[52] U.S. Cl. ............................................. 260/543 P
[51] Int. Cl. ................................................. C07f 9/52
[58] Field of Search ................................... 260/543 P

[56] References Cited
OTHER PUBLICATIONS

Bliznyuk et al., Zhurnal Obshchei Kimii, Vol. 37, No. 4, Apr. 1962, pp. 840–841, of eng. ed.

Primary Examiner—Lorraine A. Weinberger
Assistant Examiner—Richard D. Kelly

[57] ABSTRACT

Phenylphosphonous dichloride can be prepared in high yield in an autoclave process by reacting monochlorobenzene ($\phi$-Cl), phosphorus trichloride ($PCl_3$), and elemental phosphorus under such conditions that the temperature of reaction, time of reaction, and the molar ratio of $$(PCl_3)/(\phi\text{-Cl}) \text{ and } (P)/(\phi\text{-Cl})$$

satisfy the formula:

$$Y = \frac{(A)(t)}{A/R + t + \frac{(B_3)(R)(t^2)}{1000}} + B_8$$

wherein Y represents a yield of at least 60%, $t$ represents reaction time (hours) and the terms $A$ and $R$ include the reaction temperature and molar ratios of $$(PCl_3)/(\phi\text{-Cl}) \text{ and } (P)/(\phi\text{-Cl}),$$

it having been found that a critical interdependence exists between these functions if high yields are to be attained. Recycling of byproduct diphenylphosphinous chloride can further increase yields.

12 Claims, No Drawings

PROCESS FOR PREPARING PHENYLPHOSPHONOUS DICHLORIDE

The present invention relates to an improved process for preparing phenylphosphonous dichloride by the autoclave method.

BACKGROUND OF THE INVENTION

Phenylphosphonous dichloride is a known chemical intermediate for phosphorus based insecticides. Extensive quantities are used each year which are presently being prepared by the hot tube process. As demands increase, so do the requirements for more efficient processes for preparing the same. In reviewing possible new procedures, it was noted that an autoclave process for preparing phenylphosphonous dichloride was suggested by Bliznyuk et al., Zhurnal Obshchei Kimii, Vol. 37, No. 4, pp. 890–892, April, 1967, E. 840. This process comprises the steps of reacting monochlorobenzene, phosphorus trichloride, elemental phosphorus and, optionally, an iodine catalyst in an autoclave under elevated pressure at temperatures of 320°–340°C. for 7 hours. However, only 47% yields are reported for the uncatalyzed reaction. In the presence of the iodine catalyst, yields increased only to 54.6%. These yields are insufficient in light of other known technology to make the process commercially practicable. If a catalyst is used, the cost of the catalyst and the separation of the catalyst from the product would further reduce the desirability of the process. German Patent 1,945,645 shows the autoclave production of diphenylchlorophosphines.

Therefore, and in accordance with the present invention it has been found that the above described autoclave process can be utilized effectively even in the absence of a catalyst to provide phenylphosphonous dichloride in high yields.

THE INVENTION

In accordance with the present invention, phenylphosphonous dichloride can be prepared in higher yields than heretofore known by the autoclave reaction by conducting the autoclave reaction between the monochlorobenzene, phosphorus trichloride and elemental phosphorus in such a manner as to maintain a specific relationship between the time of reaction, temperature and the ratios of phosphorus trichloride and elemental phosphorus to monochlorobenzene. Yields of 80–90% can be attained using the process of the present invention. It has also been found that yields can be further improved by recycling a byproduct of the reaction, diphenylphosphinous chloride, in a specific molar ratio to the monochlorobenzene used in the reaction. Yields of over 90% can be achieved by recycling.

It has been found that in the autoclave reaction between monochlorobenzene, phosphorus trichloride and phosphorus to produce phenylphosphonous dichloride, that there is a critical interdependency which affects the final yield between time of reaction, temperature of reaction, and the ratio of phosphorus trichloride and elemental phosphorus to monochlorobenzene present. Thus, and in accordance with the present invention there is provided a new and critical method of preparing phenylphosphonous dichloride such that high yields can be obtained. Additionally, it has been found that the reaction suffers from a competing product decomposition reaction which can be controlled by using the proper conditions. Further, byproduct diphenylphosphinous chloride can be recycled to further increase yields.

TECHNICAL DISCUSSION

In accordance with the present invention it has been found that the stated reaction between phosphorus trichloride, monochlorobenzene, and phosphorus, if conducted in such a manner as to maintain a specified relationship between time ($t$), temperature (T), the molar ratio of

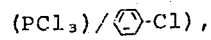

i.e., (C), the molar ratio of

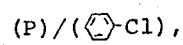

i.e., (Z), and, if recycled diphenylphosphinous monochloride is present, the molar ratio of recycled diphenylphosphinous chloride to monochloro-benzene

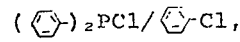

will provide higher yields of phenylphosphonous dichloride than heretofore known in the autoclave process. This relationship can be expressed mathematically as follows:

$$Y = \frac{(A)(t)}{A/R + t + \frac{(B_3)(R)(t^2)}{1000}} + B_8$$

wherein $Y$ equals % yield based on the amount of charged chlorobenzene;
$t$ equals time in hours
$A$ equals $(E)(C)/[(E/100 B_7) + C]$
$R$ equals $(Z)[10^{1B + B(T-300)}]$
$E$ equals $B_4 + B_5(T-300) + B_6(\text{Rec})$
$T$ equals temperature in degrees centigrade
$C$ equals

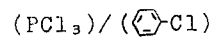

molar ratio
Rec equals

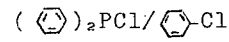

molar ratio
$Z$ equals

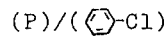

molar ratio
$B_1$ equals 1.9559
$B_2$ equals 0.0327
$B_3$ equals 0.00674
$B_4$ equals 215.26
$B_5$ equals −0.508
$B_6$ equals 147.39

$B_7$ equals 15.23
$B_8$ equals $-87.46$

Reducing the equation to its lowest form of unknowns, the following expression is obtained:

$$Y = \left[\frac{\left(\frac{[215.26-0.508(T-300)+147.39(\text{Rec})][C]}{\frac{[215.26-0.508(T-300)+147.39(\text{Rec})]}{1523}+[C]}\right)(t)}{\left(\frac{[215.26-0.508(T-300)+147.39(\text{Rec})][C]}{\frac{215.26-0.508(T-300)+147.39(\text{Rec})}{1523}+[C]}\right)+[t]+\frac{(0.00674)(t^2)(Z)\left(10^{[1.9559+0.327(T-300)]}\right)}{1000}}\right] - 87.46$$

$$\text{(Z)}\left(10^{[1.9559+0.0327(T-300)]}\right)$$

In this expression, the only variables are yield (Y), time (t), temperature (T), ratio of $$(PCl_3)/(\bigcirc\text{-Cl}),$$

i.e., (c) ratio of $$(\bigcirc)_2 PCl/\bigcirc\text{-Cl}$$

(Rec) and ratio of $$(P)/\bigcirc\text{-Cl},$$

i.e., (Z). The limits on these factors is as follows:
Time (t): from about one-fourth to about 30 hours
Temperature (T): from about 275°C. to about 400°C.
Ratio (C): from about 0.6 to about 3.0
Yield (%) (Y): 60% and up
Rec: 0.0–0.2, 0.02–0.2, more preferably 0.045–0.13.
Ratio (Z): from about 0.5 to about 2.0 and preferably about 0.6 to about 1.3, and more preferably 0.6–0.7, and most preferably 0.66.

It is to be pointed out that the amount of recycle present can actually vary from zero to an unlimited amount. Practically, the amount of recycle used is governed by the amount prepared in the previous batch as it would be uneconomical to prepare separately or purchase diphenylphosphinous chloride from an outside source and add it to the reaction though this can be done if desired. However, large excesses of recycle relative to the amount of $PCl_3$ present are to be avoided to minimize residue formation.

It is to be pointed out that there are some possible inaccuracies in the formula which show up at the higher % yields, and at higher temperatures. These deviations may be explainable by the heat history of the reaction. This is particularly true at the temperatures over 300°C. since it may take one-half hour to raise the temperature from 300°C. to 350°C. and 15 minutes to cool the reaction to 300°C. Additional reaction and/or decomposition during this period is therefore possible. While in general most of the data conforms to the formula, some variation is possible.

Since experimental error and/or heat history can cause variation in the percent yield calculated or actually obtained, the deviation between the calculated percent yield and the actual percent yield is broadly limited to a deviation ± 18.0% preferably ± 12.0% and more preferably ± 6.0% with the proviso that a yield of at least 60% yield is maintained and the yield of 100% is not exceeded.

The foregoing deviations are based on a statistically derived Standard Error of Estimate or SEE. The standard error of estimate or SEE relating to the formula of the present invention is 6.0% yield, assuming normally distributed error. Thus, and assuming an SEE of 6.0%, and a normally distributed degree of error, there is a 68% probability that yields obtained from the formula will be ± 6.0% yield. Statistically, at ± 12% deviation or 2 SEE, there is a 95% probability that values obtained from the formula will fall within the deviation. At ± 18% or 3 SEE, there is a 99% probability that the values will fall within the deviation. Standard Error of Estimate or SEE is an accepted statistical term and its computation is intended to be accomplished by the accepted formula for defining such term.

The reaction is conducted in the presence of yellow or white elemental phosphorus. The red form of phosphorus is less preferred as it has been found to be substantially inactive as compared to the yellow or white forms of phosphorus. Normal handling techniques to prevent spontaneous flammation are used.

Stoichiometrically, the reaction would appear to require at least 3 moles of monochlorobenzene and 2 moles of elemental phosphorus per mole of phosphorus trichloride. However, and in order to obtain increased yields, a specific excess of the phosphorus trichloride relative to the monochlorobenzene is required to obtain the proper molar ratio of $$(PCl_3)/(\bigcirc\text{-Cl})$$

as used in the formula. The elemental phosphorus is preferably used in an amount sufficient to provide about two-thirds moles elemental phosphorus per mole monochlorobenzene, i.e., the stoichiometric amount. The amount of phosphorus used is not critical other than to provide the minimum two-thirds mole elemental phosphorus per mole of monochlorobenzene. Lesser amounts can be used but this could be detrimental to the overall results of the reaction.

Excess elemental phosphorus can be used to increase the rate of reaction. However, excesses of elemental phosphorus over the stoichiometric amount of two-thirds mole phosphorus per mole of monochlorobenzene are converted from yellow phosphorus to red phosphorus during the reaction. The red phosphorus is undesirable since it builds up excessively on the walls of the autoclave, thereby causing fouling of the autoclave. Red phosphorus is also entrained in the product stream and is not easily removed therefrom and may cause further buildup in subsequent processing equipment. Even though excess phosphorus can increase the reaction rate, excess is preferably not used for these reasons.

If excess phosphorus is used, the red phosphorus buildup on autocalve walls and in the product stream can be eliminated by postchlorination. The phosphorus is changed to $PCl_3$ which can be recycled. Chlorination is usually accomplished at elevated temperatures, for example, around 100°C.

Since red phosphorus buildup can also occur using the stoichiometric amount of elemental phosphorus (since some red phosphorus is formed during the reaction), chlorination can be effectively used to clean the autoclave. Effective cleaning of the autoclave can be effected by draining the autoclave and adding about 20% by volume $PCl_3$. Chlorine is added and the system heated to about 100°C. The red phosphorus and chlorine form $PCl_3$ which can remain in the autoclave and be used for the next batch.

The improved process of the present invention is carried out at elevated temperature and at least at autogenus pressure. Temperatures of between about 275°C. and about 400°C. can be used and preferably between about 300°C. and about 350°C. are utilized in the reaction. The process may be conveniently effected by introducing the reactants into a reaction zone capable of withstanding elevated pressure, such as a metal bomb, autoclave, or other pressure vessel and carrying out the reaction under at least the autogenus pressure developed by the reactants at the reaction temperatures. Pressures of up to about 200 atmospheres above the autogenus pressure (about 25-75 atmospheres) can also be used but are less desirable due to the type of equipment required to hold such pressures. The pressure vessel should be equipped with an agitation mechanism (rocker, stirrer or vibrator) for best results. The time of the reaction can vary between about one-fourth hour and about 30 hours and preferably about one-half hour to about 14 hours depending on the yield desired and the temperature of reaction which is used.

The products of the reaction have been found to be readily purified by fractional distillation. The identification of products is achieved by conventional methods such as, but not necessarily limited to, elemental analysis and gas chromatography for purity and mass spectrometer and nuclear magnetic resonance (phosphorus) (NMR) and infrared analysis to establish structure.

The product of the present invention has utility as a chemical intermediate, particularly in preparing insecticides. Illustrative of this is the reaction of phenylphosphonous dichloride with sulfur to prepare benzene phosphonothioic dichloride

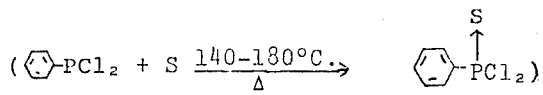

followed by reacting the phenylphosphonothioic dichloride with ethanol and p-nitrophenol in the presence of a base to prepare O-ethyl, O'-p-nitrophenyl phenylphosphonothioate (EPN):

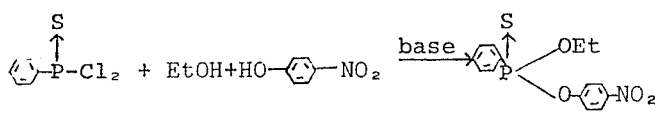

a known pesticide.

The invention is illustrated in the Examples which follow.

EXAMPLES

In a 300 cubic centimeter 316 stainless steel rocking autoclave were placed monochlorobenzene, phosphorus trichloride and phosphorus. While under rocking agitation, the autoclave was slowly heated up to reaction temperature and the heating maintained over a specified period of time. After cooling, the autoclave was opened and the contents of the autoclave were placed in a distillation flask. The contents of the flask were distilled under vacuum and the product separated. In each of the following runs 9 gms (0.30 moles) of elemental phosphorus, and 50 gms (0.45 moles) of monochlorobenzene was used. The amount of phosphorus trichloride was varied to provide the necessary ratio of $$(PCl_3)/(\text{⌬-Cl})$$

as noted by the letter "C" in the data. Each sample required about 0.75-1.0 hours to heat up to about 300°C. Approximately 6 minutes was required to raise the temperature each additional 10°C. All samples were purified by distillation and each distillation fraction was analyzed by a gas chromatographic method.

The following results were obtained showing the deviation from the calculated value:

TABLE I

| EXAMPLE NO. | TEMP (T) | TIME (t) | ($PCl_3$/(⌬-Cl)) RATIO (C) | REC | YIELD OBSERVED | YIELD CALC. | DIFFERENCE |
|---|---|---|---|---|---|---|---|
| 1 | 305 | 16.00 | 1.48 | 0.000 | 78.00 | 81.71 | 3.71 |
| 2 | 305 | 14.00 | 1.44 | 0.000 | 79.00 | 78.65 | 0.35 |
| 3 | 300 | 10.00 | 1.50 | 0.000 | 50.00 | 60.06 | 10.06 |
| 4 | 302 | 7.00 | 1.37 | 0.000 | 45.00 | 51.01 | 6.01 |
| 5 | 325 | 9.70 | 1.29 | 0.000 | 80.00 | 83.53 | 3.53 |

TABLE I – Continued

| EXAMPLE NO. | TEMP (T) | TIME (t) | (PCl$_3$/(⌬-Cl) RATIO | REC (C) | YIELD OBSERVED | YIELD CALC. | DIFFERENCE |
|---|---|---|---|---|---|---|---|
| 6  | 343 | 4.00  | 1.50 | 0.000 | 81.00 | 79.15 | 1.85 |
| 7  | 320 | 4.00  | 1.47 | 0.000 | 74.00 | 71.54 | 2.46 |
| 8  | 320 | 19.00 | 1.44 | 0.000 | 88.00 | 87.64 | 0.36 |
| 9  | 320 | 2.00  | 1.57 | 0.000 | 58.00 | 52.01 | 5.99 |
| 10 | 345 | 1.00  | 1.49 | 0.000 | 68.00 | 72.02 | 4.02 |
| 11 | 297 | 9.80  | 1.48 | 0.000 | 52.00 | 51.15 | 0.85 |
| 12 | 350 | 0.50  | 1.44 | 0.000 | 68.00 | 65.26 | 2.74 |
| 13 | 300 | 15.00 | 0.33 | 0.000 | 44.00 | 40.87 | 3.13 |
| 14 | 300 | 14.00 | 0.72 | 0.000 | 63.00 | 59.92 | 3.08 |
| 15 | 300 | 15.50 | 1.06 | 0.000 | 73.00 | 69.32 | 3.68 |
| 16 | 350 | 3.50  | 1.45 | 0.000 | 69.00 | 74.39 | 5.39 |
| 17 | 350 | 2.50  | 1.45 | 0.000 | 74.00 | 75.85 | 1.85 |
| 18 | 355 | 1.66  | 1.50 | 0.000 | 82.00 | 74.38 | 7.62 |
| 19 | 358 | 1.50  | 1.44 | 0.000 | 81.00 | 72.35 | 8.65 |
| 20 | 300 | 9.00  | 1.47 | 0.000 | 50.00 | 55.98 | 5.98 |
| 21 | 355 | 2.00  | 1.49 | 0.000 | 79.00 | 73.71 | 5.29 |
| 22 | 350 | 3.00  | 1.45 | 0.000 | 68.00 | 75.22 | 7.22 |
| 23 | 350 | 8.00  | 1.47 | 0.000 | 60.00 | 65.06 | 5.06 |
| 24 | 350 | 5.00  | 1.44 | 0.000 | 79.00 | 71.33 | 7.67 |
| 25 | 350 | 4.80  | 1.53 | 0.000 | 74.00 | 72.49 | 1.51 |
| 26 | 355 | 1.75  | 0.66 | 0.000 | 61.00 | 60.34 | 0.66 |
| 27 | 347 | 1.50  | 1.02 | 0.000 | 66.00 | 70.90 | 4.90 |
| 28 | 350 | 1.50  | 1.30 | 0.000 | 69.00 | 74.33 | 5.33 |
| 29 | 300 | 14.00 | 2.76 | 0.000 | 88.00 | 76.28 | 11.72 |
| 30 | 350 | 1.50  | 1.88 | 0.000 | 68.00 | 78.63 | 10.63 |
| 31 | 300 | 11.20 | 1.04 | 0.086 | 65.00 | 65.53 | 0.53 |
| 32 | 300 | 15.00 | 1.07 | 0.084 | 78.00 | 75.05 | 2.95 |
| 33 | 300 | 15.50 | 0.76 | 0.104 | 70.00 | 70.92 | 0.92 |
| 34 | 360 | 1.00  | 0.74 | 0.106 | 68.00 | 71.86 | 3.86 |
| 35 | 350 | 2.00  | 1.04 | 0.126 | 82.00 | 84.61 | 2.61 |
| 36 | 350 | 1.25  | 1.23 | 0.067 | 79.00 | 80.02 | 1.02 |
| 37 | 358 | 1.00  | 1.46 | 0.058 | 88.00 | 79.63 | 8.37 |

As can be seen from the data, various combinations of time ($t$), temperature (T), and mole ratio (C) can be used to provide yields of above 80%, above 70%, and above 60%. This data clearly shows the critical interdependence of these three factors. The data also show that heating too long at any one temperature can affect product yield. In Example 17, a 74% yield is obtained after heating a reaction mixture of a mole ratio 1.45 to a temperature of 350°C. temperature and a mole ratio of 1.47 and 8.0 hours, only a 60% yield is obtained. The ratio is also important as can be seen by comparing Examples 29, 2, and 14 as well as Examples 15 and 13. The variation in the concentration ratio of the phosphorus trichloride to the monochlorobenzene under any specific set time or temperature conditions can vary the yield by as much as 25%. These data show the critical interdependence of the three variables in attaining high yields.

The effectiveness of recycling the byproduct diphenyl phosphinous chloride to increase product yield is also shown by these data. In Example 15 run at 300°C. for 15.5 hours at a concentration ratio of 1.06 and no recycle, there is obtained an actual yield of phenylphosphonous dichloride of 73%. In Example 32 run at 300°C. for 15 hours at a concentration ratio of 1.07 and a recycle ratio of 0.084 there is obtained a 78% yield of phenylphosphonous dichloride. This is a 5% increase in yield. A comparison of Examples 28 (69% yield with no recycle) and 36 (79% yield with recycle) shows a 10% increase in yield with recycle even though a slightly shorter reaction time and slightly lower concentration ratio were used in the recycle experiment.

Further evidence of the effectiveness of the invention can be shown in the following computer generated data wherein a set temperature was used in the calculations and the molar ratio of $$(PCl_3)/(⌬\text{-}Cl)$$

i.e., (C) was set out in four specific groupings of 0.5, 1.0, 1.5, and 2.0. The molar ratio of $$(P)/(⌬\text{-}Cl),$$

i.e., (Z), was held constant at two-thirds mole of elemental phosphorus per mole of monochlorobenzene. As can be seen from the presented data, considerable variation occurs between time and yield assuming a constant temperature and molar ratio (C).

TABLE II

| TEMP. | MOLAR RATIO TIME (Hrs) | C=0.5 YIELD* | C=1.0 YIELD* | C=1.5 YIELD* | C=2.0 YIELD* |
|---|---|---|---|---|---|
| 300° |  | — | 4.4 | 6.2 | 7.2 |
|  | 5 | 19.8 | 28.0 | 31.0 | 32.5 |
|  | 10 | 43.1 | 55.4 | 60.1 | 62.5 |
|  | 15 | 53.2 | 67.6 | 73.0 | 75.9 |
|  | 20 | 58.6 | 74.3 | 80.3 | 83.4 |
|  | 30 | 64.3 | 81.3 | 87.9 | 91.4 |
| 320° | 1 | 13.4 | 20.6 | 23.2 | 24.6 |
|  | 2 | 36.5 | 47.5 | 51.6 | 53.8 |
|  | 4 | 52.2 | 66.4 | 71.8 | 74.6 |
|  | 8 | 60.8 | 77.1 | 83.3 | 86.6 |
|  | 15 | 63.9 | 81.2 | 87.8 | 91.3 |
|  | 20 | 64.1 | 81.5 | 88.2 | 91.8 |
| 340° | 0.5 | 35.7 | 46.6 | 50.7 | 52.8 |
|  | 1 | 49.2 | 62.8 | 67.9 | 70.6 |
|  | 2 | 56.2 | 71.5 | 77.3 | 80.4 |
|  | 4 | 58.3 | 74.3 | 80.5 | 83.7 |
|  | 8 | 56.1 | 72.1 | 78.2 | 81.5 |
| 360° | 0.2 | 42.6 | 54.9 | 59.5 | 61.9 |
|  | 0.5 | 51.2 | 65.3 | 70.7 | 73.5 |
|  | 1 | 52.3 | 67.0 | 72.6 | 75.6 |
|  | 2 | 49.3 | 63.9 | 69.5 | 72.4 |
|  | 4 | 41.3 | 55.2 | 60.5 | 63.3 |

* Predicted

As can be seen from these data and particularly in connection with the elevated temperature data, the reaction reaches a maximum point after which yields fall off. This is due to a side reaction which degrades the product. If high, yields are to be obtained, the reaction must be halted at the point of highest yield and not allowed to proceed or else product yield suffers.

Also, computer generated data show the effectiveness of the recycling of byproduct diphenylphosphinous chloride. Using a set temperature and time, and a varying molar ratio of

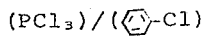

i.e., (C), there is shown greater predicted yields using the recycle than that obtained when the recycle is not used.

As can be seen from the table, predicted yields are increased from 4.6 to 9.6% using recycled diphenylphosphinous chloride. These data are supported by the actual data in Table I.

It is noted that the amount of recycled diphenylphosphinous chloride is decreased as the ratio of

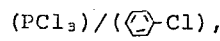

i.e., (C), is increased. This is to correspond to actual experimental results wherein it was observed that as the ratio of

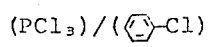

i.e., (C), is increased, the amount of diphenylphosphinous chloride formed is decreased. In order to approximate the amount of recycle which would remain from a preceeding batch, hence recycle, a lesser amount was used in the computations as the ratio of

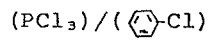

was increased.

The amount of elemental phosphorus used in the reaction has an effect on the reaction rate. Stoichiometrically, about two-thirds mole elemental phosphorus is required per mole of monochlorobenzene. Excess elemental phosphorus over the

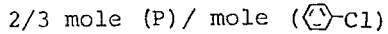

will provide increased reaction rates as shown in the following data:

TABLE III *

| TEMP (°C.) | TIME (hrs.) | C | RECYCLE | YIELD % (PREDICTED) | % YIELD INCREASE (PREDICTED) |
|---|---|---|---|---|---|
| 300 | 15.00 | .75 | 0 | 62.4 |  |
|  |  | .75 | 0.10 | 69.5 | 7.1 |
|  |  | 1.0 | 0 | 67.6 |  |
|  |  | 1.0 | 0.8 | 73.6 | 6 |
|  |  | 1.5 | 0 | 73.0 |  |
|  |  | 1.5 | 0.6 | 77.9 | 4.9 |
| 350 | 1.5 | .75 | 0 | 65.0 |  |
|  |  | .75 | 0.1 | 74.6 | 9.6 |
|  |  | 1.0 | 0 | 70.4 |  |
|  |  | 1.0 | 0.08 | 78.6 | 8.2 |
|  |  | 1.5 | 0 | 76.2 |  |
|  |  | 1.5 | 0.06 | 82.9 | 6.7 |

* Z held constant at 2/3 mole elemental phosphorus per mole monochlorobenzene

TABLE IV

| EXAMPLE No. | 38 | 39 | 40 | 41 | 42 | 43 |
|---|---|---|---|---|---|---|
| Monochlorobenzene | 0.45 | 0.43 | 0.45 | 0.44 | 0.45 | 0.45 |
| Phosphorus Trichloride | 0.66 | 0.64 | 0.65 | 0.65 | 0.66 | 0.65 |
| Elemental Phosphorus | 0.29 | 0.29 | 0.53 | 0.30 | 0.29 | 0.60 |
| (P)/(⌬-Cl) mole ratio (Z) | 0.64 | 0.67 | 1.18 | 0.68 | 0.64 | 1.33 |
| % Excess Phosphorus * | 0 | 0 | 83% | 0 | 0 | 100% |
| Time (hours) | 0.5 | 1.0 | 0.5 | 10 | 16 | 10 |
| Temperature (°C.) | 342 | 345 | 342 | 300 | 300 | 293 |
| Yield (%) | 58 | 74 | 76 | 52 | 78 | 73 |
| % Conversion ⌬-Cl | 61 | 86 | 87 | 67 | 96 | 86 |
| Calculated Yield ** | 55 | 72 | 67 | 51 | 82 | 68 |

\* % excess above 2/3 mole (P)/ mole (⌬-Cl).
  \*\* based on normalized Z values of .66 relative to examples 38, 39, 41, and 42.

As can be seen from the preceeding data, the use of an 83% excess amount of elemental phosphorus can almost double the reaction rate, i.e., cutting the reaction time in half. Reaction rate increases are also shown in using 100% excess elemental phosphorus. The data shows that reaction temperatures even can be slightly lowered while still obtaining effective rates and yields.

EXAMPLE 44

In a dry 300 cubic centimeter 316 stainless steel rocking autoclave purged with nitrogen were placed the following reagent

|  | Grams | Moles |
|---|---|---|
| $PCl_3$ | 90 | 0.66 |
| ⌬—Cl | 50 | 0.445 |
| P (yellow) | 9 | 0.29 |

Mole ratio of $PCl_3$/ ⌬-Cl (C) = 0.66/0.445 = 1.48

Mole ratio of P/ ⌬-Cl (Z) = 0.29/0.445 = 0.65

The chlorobenzene was dried over phosphorus pentoxide before use. The phosphorus was weighed under water and dried by dipping in isopropyl alcohol.

After charging, the autoclave was placed in the heater/rocker assembly. The reaction mixture was heated using the following heating schedule:

```
Temperature             Time
  20° to 275°C.         90 minutes heating time
  275°C.                80 minutes (held).
  310-315°C.            13 hours (held).
Cooled to room temperature.
```

After cooling, the autoclave was opened and 145 grams of material was poured from the autoclave. 142 grams was poured into a distillation flask for product isolation. Upon distillation the following results were obtained:

| Cut No. | Liquid Temp. (°C.) | Vapor Temp (°C.) | Pressure (mm) | Yield (gms) |
|---|---|---|---|---|
| 1 | 85–180 | 75–110 | Atmospheric | 68 |
| 2 | 110–130 | 105–110 | 24 | 59 |
| 3 | 120–180 | 80–120 | 0.1 | 8 |
| Residue |  |  |  | 3 |

Gas chromatographic analysis showed Cut No. 1 to be principally $PCl_3$ with a trace of chlorobenzene.

Cut No. 2 was the desired phenylphosphonous dichloride product $n_D^{25} = 1.5957$ (same index of refraction as commercial sample of the same material).

Cut No. 3, as analyzed by gas chromatography, showed about a 50/50 mixture of phenylphosphonous dichloride and diphenylphosphinous chloride Yields PCl₃ = 68 grams (0.496m) = 97% excess Product 63 gram (0.352 m) = 81% on P charged 79% on ⬡-Cl charged

EXAMPLE 45

Using the same procedure as in Example 44 the following materials were charged:

|  | Grams | Moles |
|---|---|---|
| PCl₃ | 55 | 0.4 |
| ⬡-Cl | 45 | 0.4 |
| P (Yellow) | 6.2 | 0.2 |

Mole ratio PCl₃/⬡-Cl (C) = 0.4/0.4 = 1

Mole ratio P/⬡-Cl (Z) = 0.2/0.4 = 0.5

The reaction mixture was heated at 300°C. for 7 hours. The product was isolated by distillation. Yield of phenylphosphonous dichloride was 17.5 grams or 24.5% based on chlorobenzene charged. Yield based on phosphorus charged was 32%. Insufficient time and/or temperature and/or reactants contributed to the low yield.

The invention is defined in the claims which follow.
What is claimed is:

1. In a method for preparing phenylphosphonous dichloride by the reaction of monochlorobenzene, phosphorus trichloride and elemental phosphorus substantially all in the yellow or white form in an autoclave, the improvement which comprises reacting said reactants at a temperature (T) within the range of from about 275°C. to about 400°C. for a period of time ($t$) of from about one-fourth hour to about 30 hours using a concentration of phosphorus trichloride, phosphorus, and chlorobenzene in amounts sufficient to provide a molar ratio (C) of $$(PCl_3)/(⬡-Cl)$$

within the range of from about 0.6 and about 3, and a molar ratio (Z) of elemental phosphorus to said chlorobenzene within the range of from about 0.5 to about 2.0, said temperature, time and molar ratios being selected in such a manner sufficient to satisfy the requirements of the formula:

$$Y = \frac{(A)(t)}{A/R + t + \frac{(B_3)(R)(t^2)}{1000}} + B_8$$

wherein Y equals % yield based on the amount of charged chlorobenzene and phosphorus relative to the ratio of $$6(⬡-Cl)P_4$$

$t$ equals time in hours
$A$ equals $(E)(C)/[(E/100B_7) + C]$
$R$ equals $(Z)[10^{B + B_2(T-300)}]$
$E$ equals $B_4 + B_5(T-300) + B_6(Rec)$
$T$ equals temperature in degrees centigrade
$C$ equals $$(PCl_3)/(⬡-Cl)$$

molar ratio
Rec equals $$(⬡)_2PCl/⬡-Cl$$

molar ratio
$Z$ equals $$(P)/(⬡-Cl)$$

molar ratio
$B_1$ equals 1.9556
$B_2$ equals 0.0327
$B_3$ equals 0.00674
$B_4$ equals 215.26
$B_5$ equals $-0.508$
$B_6$ equals 147.39
$B_7$ equals 15.23
$B_8$ equals $-87.46$ wherein the time, temperature and molar ratios are selected to provide a yield of at least 60% or higher, said formula having a confidence limit of ± 18.0% on the percent yield with the proviso that the yield be at least 60%.

2. The method as recited in claim 1 wherein the temperature is within the range of from about 300°C. to about 350°C., the time is within the range of from about one-half hour to about 14 hours and the molar ratio is about 1.0.

3. The method as recited in claim 1 wherein Y is at least 70%.

4. The method as recited in claim 1 wherein Y is at least 80%.

5. The method as recited in claim 1 wherein the ratio of $$(⬡)_2PCl/(⬡-Cl)$$

as labeled Rec is between about 0.02 and about 0.2.

6. The method as recited in claim 5 wherein Rec is between about 0.045 and about 0.13.

7. The method as recited in claim 1 wherein the confidence limits are ± 12%.

8. The method as recited in claim 1 wherein the confidence limits are ± 6%.

9. The method as recited in claim 1 wherein temperature (T) is 350°C., time (t) is 2 hours, $$(PCl_3)/(\langle\bigcirc\rangle\text{-}Cl)$$

ratio (C) is 1.04, recycle (Rec) is 0.126, yield is 82.0%, and deviation is 2.61%.

10. The method as recited in claim 1 wherein the ratio of $$(P)/(\langle\bigcirc\rangle\text{-}Cl)$$

labeled as Z is from about 0.6 to about 0.7.

11. The method as recited in claim 10 wherein said ratio Z is 0.66.

12. The method of claim 1 which includes the further step of post-chlorinating the reaction mixture to remove red phosphorus.

* * * * *

UNITED STATES PATENT AND TRADEMARK OFFICE
CERTIFICATE OF CORRECTION

PATENT NO. : 3,864,394
DATED : February 4, 1975
INVENTOR(S) : Francis A. Via; Eugene H. Uhing & Arthur D. F. Toy It is certified that error appears in the above-identified patent and that said Letters Patent are hereby corrected as shown below:

Page 1, References Cited, line 3, "1962" should read -- 1967 --;
Column 2, line 41, "R equals (Z) $[10^{[B + B(T-300)]}]$" should read -- R equals (Z)$(10^{[B_1 + B_2(T-300)]})$ --;

Column 3, line 39, after "0.0-0.2;" insert -- preferably --;
Column 7, line 48, after "350°C." insert -- for 2.5 hours. But in Example 23, using 250°C. --;
Column 9, line 5, Table II, Under "TIME(Hrs)" insert -- 3 --;
Column 14, line 3, "R equals (Z)$[10^{[B + B(T-300)]}]$ and insert -- R equals (Z)$(10^{[B_1 + B_2(T-300)]})$ .

Signed and Sealed this ninth Day of September 1975

[SEAL]

Attest:

RUTH C. MASON
*Attesting Officer*

C. MARSHALL DANN
*Commissioner of Patents and Trademarks*